US006672650B2

(12) United States Patent
Winget

(10) Patent No.: US 6,672,650 B2
(45) Date of Patent: Jan. 6, 2004

(54) PLASTIC PANEL WITH INTEGRALLY MOLDED SPEAKER GRILLE

(75) Inventor: Larry J. Winget, Leonard, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 09/833,402

(22) Filed: Apr. 11, 2001

(65) Prior Publication Data

US 2002/0150274 A1 Oct. 17, 2002

(51) Int. Cl.[7] .................................................. B60J 5/04
(52) U.S. Cl. ................................ 296/146.7; 296/146.1; 296/146.5
(58) Field of Search ........................... 296/146.5, 146.7, 296/152, 146.1; 49/502

(56) References Cited

U.S. PATENT DOCUMENTS 4,196,791 A 4/1980 Gottlieb
4,281,224 A * 7/1981 Castagna .................... 181/150
4,728,143 A * 3/1988 Tanino et al. ............... 296/153
4,853,966 A 8/1989 Skrzycki
5,416,283 A * 5/1995 Dault et al. ................. 181/150
5,529,370 A * 6/1996 Veit ......................... 296/146.7
5,584,144 A * 12/1996 Hisano ........................ 49/502
5,623,133 A * 4/1997 Kurihara ..................... 181/150
D389,152 S * 1/1998 Kurihara .................... D14/219
5,820,191 A * 10/1998 Blakewood, Jr. et al. 296/37.13
5,838,809 A * 11/1998 Sato et al. .................. 381/409
5,897,157 A * 4/1999 Yamaguhi et al. ....... 296/146.7
5,904,002 A 5/1999 Emerling et al.
5,919,544 A * 7/1999 Terajima ..................... 428/116
5,927,020 A * 7/1999 Kobrehel ..................... 49/502
5,931,682 A * 8/1999 Takiguchi et al. ....... 296/146.7
6,164,953 A 12/2000 Winget
6,196,606 B1 * 3/2001 McGoldrick ............. 296/37.13
6,226,927 B1 * 5/2001 Bertolini et al. .............. 49/502

* cited by examiner

*Primary Examiner*—Joseph D. Pape
*Assistant Examiner*—Gregory A Blankenship
(74) *Attorney, Agent, or Firm*—Brooks Kushman P.C.

(57) ABSTRACT

A vehicle plastic panel includes a plastic panel body and a speaker grille integrally injection molded with a plastic panel body. The speaker grille has a plurality of sound passages formed therethrough from a front surface to a rear surface, and has a cross-hatched upstanding rib pattern extending from the rear surface.

24 Claims, 3 Drawing Sheets

*Fig. 1*
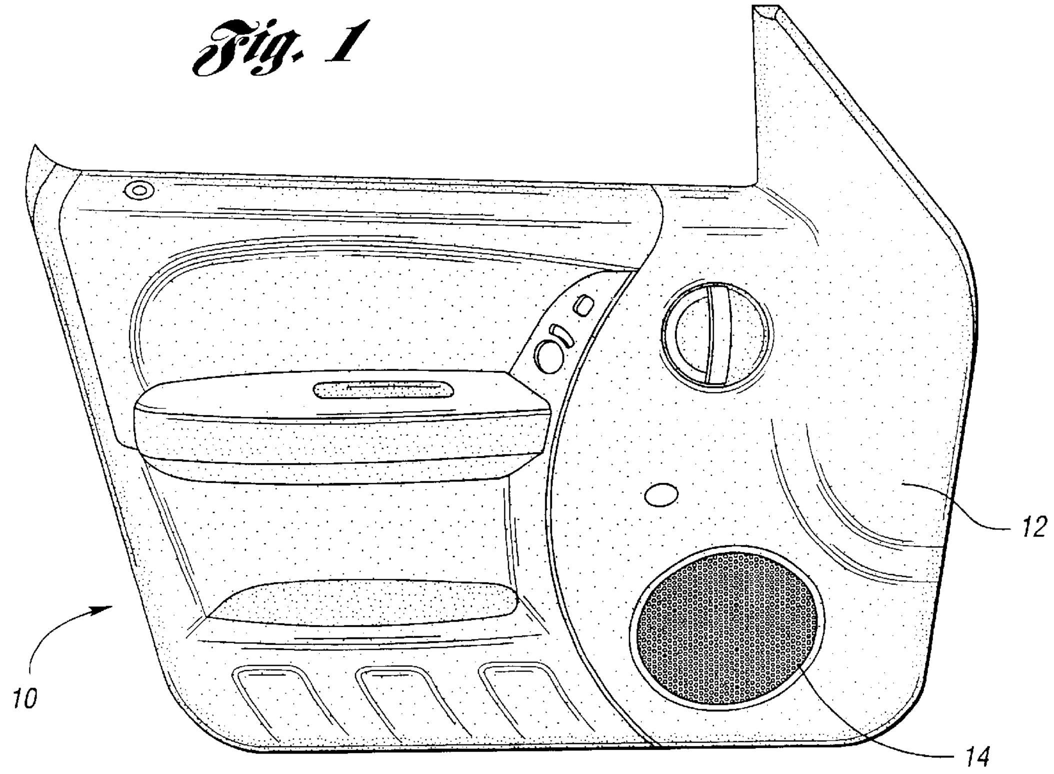
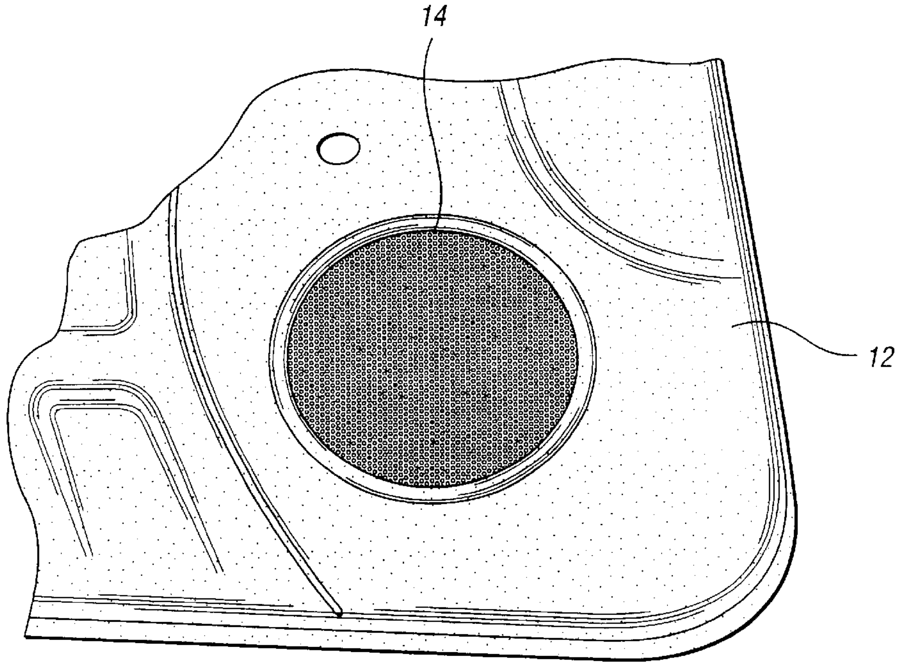
*Fig. 2*

PLASTIC PANEL WITH INTEGRALLY MOLDED SPEAKER GRILLE

BACKGROUND OF THE INVENTION

1. Field of the Invention

The present invention relates to a vehicle plastic panel including an integrally molded speaker grille having a cross-hatched upstanding rib pattern extending from a rear surface of the speaker grille.

2. Background Art

Typically, vehicle door panels are injection molded components which include an opening configured to receive a speaker grille which is affixed into the opening on the plastic panel. The speaker grille is a separate component from the plastic panel, and therefore requires separate tooling, handling and assembly, and may present squeak and rattle issues as the speaker grille rubs against the door panel. Additionally, appearance and fit-and-finish of the relationship between the inserted speaker grille and the door panel can pose ongoing problems in manufacturing and assembly.

U.S. Pat. Nos. 4,853,966 and 5,904,002 show prior art vehicle doors which include a speaker opening to which a speaker grille is attached. It is desirable to provide a panel, such as a vehicle door panel, in which the above-referenced problems associated with noise, squeak and rattle issues, fit-and-finish, and high tooling and labor costs associated with affixing a separate speaker grille to a plastic panel are eliminated.

U.S. Pat. No. 4,196,791 teaches a speaker grille including a molded plastic member and has stress regions in which there are no openings. The stress regions extend across the grille in an "X" pattern. This configuration is particularly useful for small electronic devices, such as a hand-held radio or paging devices which includes a sound transducer.

SUMMARY OF THE INVENTION

The present invention overcomes the above-referenced shortcomings of prior art plastic panel and speaker grille configurations by providing a speaker grille which is integrally molded with a plastic panel. The speaker grille includes a cross-hatched upstanding rib pattern extending from its rear surface to facilitate flow of molten plastic across the mold cavity area which forms the speaker grille in a molding operation to prevent short shots and trapped gases.

More specifically, the present invention provides a vehicle plastic panel, such as a door panel, which includes a plastic panel body and a speaker grille integrally injection molded with the plastic panel body. The speaker grille has a plurality of sound passages formed therethrough from a front surface to a rear surface, and includes a cross-hatched upstanding rib pattern extending from the rear surface.

This configuration is intended specifically for use as a vehicle door panel, but may be implemented in any plastic panel having a speaker therebehind.

Preferably, the sound passages are formed by a labyrinth pattern of adjoined wall segments having a thickness (t) less than one-half the width ($w_h$) of each sound passage. The wall segment thickness (t) is preferably approximately one millimeter, and the sound passage width ($w_h$) is preferably approximately 2.5 mm.

Each rib of the upstanding rib pattern has a rib thickness ($r_t$) which is approximately one-half the thickness of the speaker grille. Also, the rib thickness ($r_t$) is substantially equal to the thickness (t) of each wall segment.

Accordingly, an object of the invention is to provide a speaker grille which is integrally molded with a plastic panel to eliminate the above-described problems and costs associated with attaching a separate speaker grille into an existing hole in the panel.

The above object and other objects, features, and advantages of the present invention are readily apparent from the following detailed description of the best mode for carrying out the invention when taken in connection with the accompanying drawings.

BRIEF DESCRIPTION OF THE DRAWINGS

FIG. 1 shows a plan view of an injection molded plastic door panel in accordance with the present invention;

FIG. 2 shows an enlarged partially cut-away view of the door panel of FIG. 1;

DETAILED DESCRIPTION OF THE PREFERRED EMBODIMENT

Figure 3:
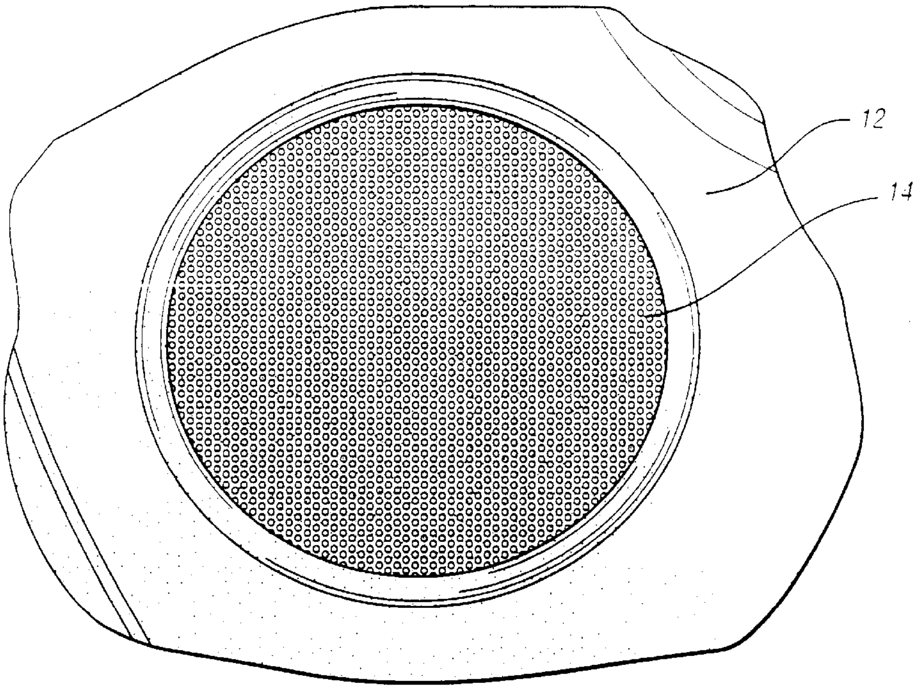
FIG. 3 shows a partially cut-away, further enlarged view of the speaker grille portion of the plastic door panel of FIG. 2.

Referring to FIGS. 1–3, a vehicle door panel 10 is shown in accordance with the present invention, and includes a plastic door panel body 12 with an integrally injection molded speaker grille 14.

Figure 4:
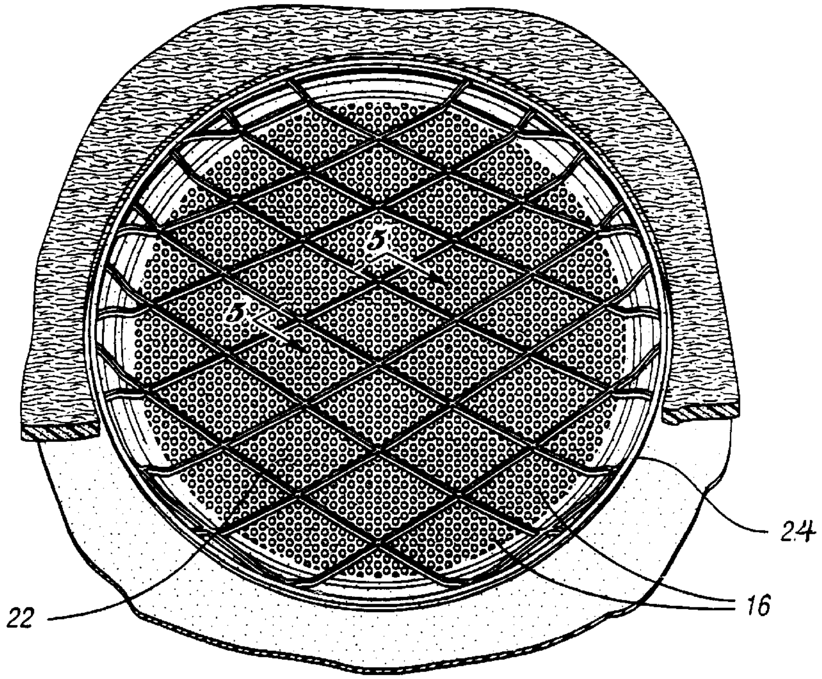
FIG. 4 shows a cut-away rear plan view of the speaker grille portion of FIG. 3.
Figure 5:
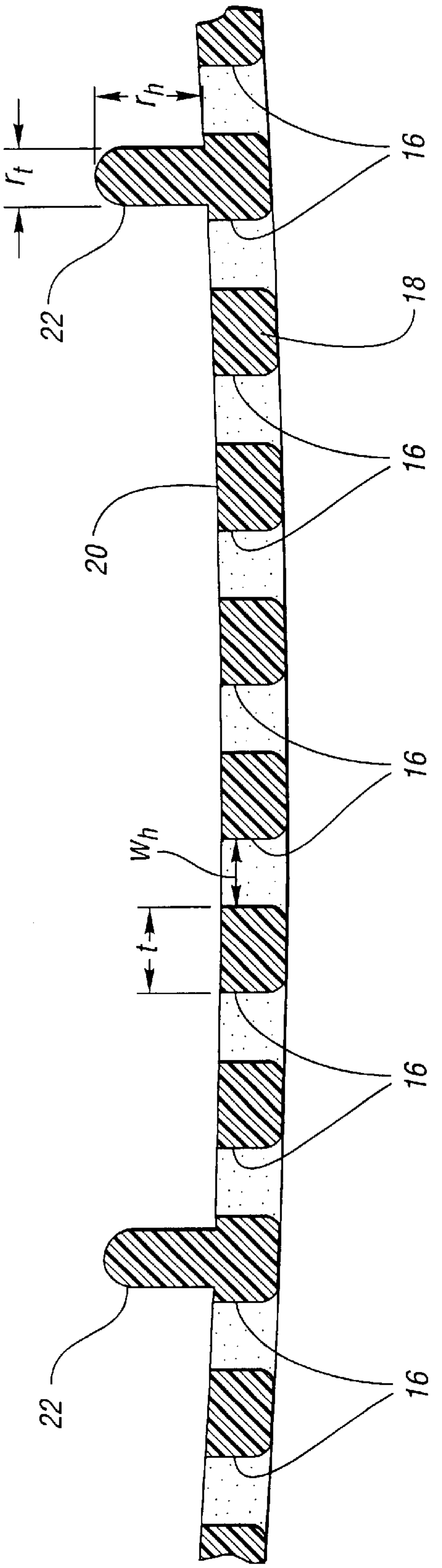
FIG. 5 shows a sectional view taken at line 5—5 of FIG. 4.

As shown in FIGS. 4 and 5, the speaker grille includes a plurality of sound passages 16 formed therethrough from a front surface 18 to a rear surface 20. A cross-hatched upstanding rib pattern 22 extends from the rear surface 20, and forms a plurality of enmeshed diamond shapes, as viewed in FIG. 4.

As viewed in FIG. 1, the speaker grille 14 forms less than approximately 15% of the surface area of the plastic door panel body 12. Returning to FIG. 4, a round rim 24 protrudes from the rear surface 20 and circumscribes the speaker grille 14.

Referring to FIG. 5, each rib of the upstanding rib pattern 22 has a rib thickness $r_t$ of approximately 0.75 mm, or between approximately 0.5 mm and 1.0 mm. Each rib is approximately 3 mm in height $r_h$. The door panel body 12 is approximately 2 mm thick in the speaker grille area. The sound passages 16 are formed by a labyrinth pattern of adjoined wall segments having a thickness (t) less than one-half the width ($w_h$) of each sound passage. Preferably, the thickness (t) of each wall segment is 1 mm between adjacent sound passages 16, and the width ($w_h$) of each sound passage is approximately 2.5 mm. This width ($w_h$) is sufficient to enable sound waves, such as those corresponding with music from a vehicle speaker, to pass through the sound passages 16 undistorted. The labyrinth pattern of adjoined wall segments is specifically dimensioned to provide structural integrity and sound quality without vibrations.

The specific dimensions described above are achieved by a combination of injection molding techniques and part design knowledge to achieve the required structural and acoustic performance characteristics.

The rib pattern facilitates flow of molten plastic across the speaker grille within the mold cavity to prevent short shots and trapped gas. The rib pattern increases the cross-sectional flow area for molten plastic as it is injected into and fills the speaker grille-forming portion of the mold cavity, which increases melt flow to the area and enhances mold-filling to prevent short shots (i.e., parts which are not completely filled out in the mold cavity).

Also, porous mold portions are provided on the mold surface forming the speaker grille to further address the trapped gas problem. This technology is described in U.S. Pat. No. 6,164,953, which is hereby incorporated by reference in its entirety.

While the best mode for carrying out the invention has been described in detail, those familiar with the art to which this invention relates will recognize various alternative designs and embodiments for practicing the invention without departing from the spirit and scope of the invention as defined in the appended claims.

What is claimed is:

1. A vehicle door panel comprising:

a plastic door panel body; and a speaker grille integrally injection molded with the plastic door panel body, said speaker grille having a plurality of sound passages formed therethrough from a front surface to a rear surface, and having a cross-hatched upstanding rib pattern extending from the rear surface, wherein said sound passages are formed by a labyrinth pattern of adjoined wall segments having a thickness (t) less than one-half the width ($w_h$) of each sound passage to provide structural integrity and sound quality without vibrations.

2. The vehicle door panel of claim 1, wherein said thickness (t) is approximately 1 mm and said width ($w_h$) is approximately 2.5 mm.

3. The vehicle door panel of claim 1, wherein said cross-hatched upstanding rib pattern forms a plurality of enmeshed diamond shapes.

4. The vehicle door panel of claim 3, wherein said plurality of enmeshed diamond shapes facilitates and enhances mold-filling and increases cross-sectional flow area flow of molten plastic across the speaker grille as the molten plastic is injected into and fills a speaker grille-forming portion of a mold cavity to prevent short shots and trapped gas.

5. The vehicle door panel of claim 1, wherein said speaker grille forms less than approximately 15% of the surface area of the plastic door panel body.

6. The vehicle door panel of claim 1, further comprising a round rim protruding from the rear surface and circumscribing the speaker grille.

7. The vehicle door panel of claim 1, wherein each rib of said upstanding rib pattern comprises a rib thickness ($r_t$) which is approximately one-half the thickness of the speaker grille.

8. The vehicle door panel of claim 7, wherein said rib thickness ($r_t$) is substantially equal to said thickness (t) of each wall segment.

9. The vehicle door panel of claim 7, wherein said rib thickness ($r_t$) is approximately 0.75 mm and said thickness of the speaker grille is approximately 2 mm.

10. The vehicle door panel of claim 9, wherein each said rib is approximately 3 mm in height.

11. The vehicle door panel of claim 7, wherein said rib thickness is between approximately 0.5 mm and 1.0 mm, and the height of each rib is between approximately 2.5 mm and 3.5 mm.

12. A vehicle panel comprising:

a plastic panel body; and a speaker grille integrally injection molded with the plastic panel body, said speaker grille having a plurality of sound passages formed therethrough from a front surface to a rear surface, and having a cross-hatched upstanding rib pattern extending from the rear surface, wherein said sound passages are formed by a labyrinth pattern of adjoined wall segments having a thickness (t) less than one-half the width ($w_h$) of each sound passage to provide structural integrity and sound quality without vibrations.

13. The vehicle panel of claim 12, wherein said thickness (t) is approximately 1 mm and said width ($w_h$) is approximately 2.5 mm.

14. The vehicle panel of claim 12, wherein said cross-hatched upstanding rib pattern forms a plurality of enmeshed diamond shapes.

15. The vehicle panel of claim 14, wherein said plurality of enmeshed diamond shapes facilitates and enhances mold-filling and increases cross-sectional flow area flow of molten plastic across the speaker grille as the molten plastic is injected into and fills a speaker grille-forming portion of a mold cavity to prevent short shots and trapped gas.

16. The vehicle panel of claim 12, wherein said speaker grille forms less than approximately 15% of the surface area of the plastic panel body.

17. The vehicle panel of claim 12, further comprising a round rim protruding from the rear surface and circumscribing the speaker grille.

18. The vehicle panel of claim 12, wherein each rib of said upstanding rib pattern comprises a rib thickness ($r_t$) which is approximately one-half the thickness of the speaker grille.

19. The vehicle panel of claim 18, wherein said rib thickness ($r_t$) is substantially equal to said thickness (t) of each wall segment.

20. The vehicle panel of claim 18, wherein said rib thickness ($r_t$) is approximately 0.75 mm and said thickness of the speaker grille is approximately 2 mm.

21. The vehicle panel of claim 20, wherein each said rib is approximately 3 mm in height.

22. The vehicle panel of claim 18, wherein said rib thickness is between approximately 0.5 mm and 1.0 mm, and the height of each rib is between approximately 2.5 mm and 3.5 mm.

23. A vehicle plastic panel comprising:

a plastic panel body;

a speaker grille integrally injection molded with the plastic panel body, said speaker grille having a plurality of sound passages formed therethrough from a front surface to a rear surface, and having a cross-hatched upstanding rib pattern extending from the rear surface;

wherein said speaker grille forms less than approximately 15% of the surface area of the plastic panel body, and each rib of said upstanding rib pattern comprises a rib thickness between approximately 0.5 mm and 1.0 mm;

wherein said sound passages are formed by a labyrinth pattern of adjoined wall segments having a thickness (t) less than one-half the width ($w_h$) of each sound passage to provide structural integrity and sound quality without vibrations;

wherein each rib of said upstanding rib pattern comprises a rib thickness ($r_t$) which is approximately one-half the thickness of the speaker grille; and wherein said rib thickness ($r_t$) is substantially equal to said thickness (t) of each wall segment.

24. The vehicle panel of claim 23 wherein said panel comprises a door panel.

* * * * *